(12) United States Patent
Lee et al.

(10) Patent No.: US 8,229,167 B2
(45) Date of Patent: Jul. 24, 2012

(54) OPTICAL TRACKING DEVICE AND POSITIONING METHOD THEREOF

(75) Inventors: Shih-Tseng Lee, Taipei (TW); Yau-Zen Chang, Taoyuan County (TW); Chan-Peng Lo, Taichung County (TW)

(73) Assignee: Chang-Gung University, Taoyuan County (TW)

( * ) Notice: Subject to any disclaimer, the term of this patent is extended or adjusted under 35 U.S.C. 154(b) by 430 days.

(21) Appl. No.: 12/689,555

(22) Filed: Jan. 19, 2010

(65) Prior Publication Data
US 2011/0064270 A1   Mar. 17, 2011

(30) Foreign Application Priority Data
Sep. 16, 2009  (TW) .............................. 98131298 A

(51) Int. Cl.
*G06K 9/00* (2006.01)
(52) U.S. Cl. .......................... 382/103; 348/169; 128/922
(58) Field of Classification Search .................. 382/100, 382/103, 106, 128–131, 162, 165; 348/135, 348/143, 116, 169–172; 128/922; 378/4, 378/11
See application file for complete search history.

(56) References Cited

U.S. PATENT DOCUMENTS

| | | | | |
|---|---|---|---|---|
| 5,495,429 A * | 2/1996 | Craven et al. | ................ | 702/127 |
| 6,377,249 B1 * | 4/2002 | Mumford | ...................... | 345/179 |
| 6,559,884 B1 * | 5/2003 | Tamir et al. | .............. | 348/207.99 |
| 7,072,707 B2 * | 7/2006 | Galloway et al. | ............. | 600/424 |
| 7,352,892 B2 * | 4/2008 | Zhang et al. | ................... | 382/154 |
| 8,077,914 B1 * | 12/2011 | Kaplan | ..................... | 382/103 |
| 8,126,203 B2 * | 2/2012 | Rhoads et al. | ................ | 382/100 |
| 2005/0180623 A1 * | 8/2005 | Mueller et al. | ................. | 382/154 |
| 2010/0046791 A1 * | 2/2010 | Glickman et al. | ............ | 382/100 |
| 2011/0221672 A1 * | 9/2011 | Osterhout et al. | ............ | 345/156 |

* cited by examiner

*Primary Examiner* — Anand Bhatnagar
(74) *Attorney, Agent, or Firm* — WPAT, P.C.; Anthony King

(57) ABSTRACT

The present invention discloses an optical tracking device and a positioning method thereof. The optical tracking device comprises several light-emitting units, several image tracking units, an image processing unit, an analysis unit, and a calculation unit. First, the light-emitting units are correspondingly disposed on a carrier in geometric distribution and provide light sources. Secondly, the image tracking units track the plurality of light sources and capture images. The images are subjected to image processing by the image processing unit to obtain light source images corresponding to the light sources from each image. Then the analysis unit analyzes the light source images to obtain positions and colors corresponding to the light-emitting units. Lastly, the calculation unit establishes three-dimensional coordinates corresponding to the light-emitting units based on the positions and colors and calculates the position of the carrier based on the three-dimensional coordinates.

20 Claims, 12 Drawing Sheets

OPTICAL TRACKING DEVICE AND POSITIONING METHOD THEREOF

BACKGROUND OF THE INVENTION (a) Field of the Invention

The present invention relates to an optical tracking device and a positioning method thereof, and more particularly to a technical field of tracking an active light source using a camera to assist surgical navigation.

(b) Description of the Prior Art

Nowadays, a carrier is generally combined with a positioning system to achieve more accurate surgery in surgical navigation. When the carrier is a surgical knife, a surgeon can hold the surgical knife with hand to perform surgery. The positioning system sends image data back to a display interface so that the surgeon can view pictures displayed on the display interface to repair tissues or remove the nidus.

In the prior art, positioning systems can be classified into two categories: electromagnetic positioning systems and optical positioning systems. However, electromagnetic waves transmitted and received by an electromagnetic positioning system interfere with the medical equipment in use and then decrease the sensitivity of the medical equipment. In terms of an optical positioning system, an optical tracking system provided by Northern Digital Inc. (NDI) is used to emit infrared and detect the position of the carrier by detecting infrared. Since the view angle of a detection device is limited, the detection range is restricted, the optical tracking system will lose the navigation function when the carrier is out of the detection range. This results in inconvenience to the surgeon in the surgery.

SUMMARY OF THE INVENTION

In view of the aforementioned problems of the prior art, an object of the present invention is to provide an optical tracking device and a positioning method thereof, so as to achieve the goal of surgical navigation.

According to the object of the present invention, there is provided an optical tracking device comprising light-emitting units, image tracking units, an image processing unit, an analysis unit, and a calculation unit. The light-emitting units are correspondingly disposed on a plane of a carrier in geometric distribution and provide light sources of different colors. Each of image tracking units is tilted along horizontal axes and vertical axes in order to track the light sources and capture images. The image processing unit is connected with the image tracking units and processes each image of the images to obtain light source images corresponding to the light sources. The analysis unit is connected with the image processing unit and analyzes the light source images to obtain positions and colors corresponding to the light-emitting units. The calculation unit is connected with the analysis unit and establishes three-dimensional coordinates corresponding to the light-emitting units based on their positions and colors, and then calculates the position of the carrier based on the three-dimensional coordinates.

The light sources comprise a red light source, a green light source, and a blue light source. Also there is a calibration unit can calibrate the image tracking units by neural network algorithm and the calculation unit can obtain the three-dimensional coordinates based on a stereo vision algorithm.

When the image processing unit processes the images using binary conversion, the image processing unit retains the brighter portions of each image. Also, when the image processing unit processes the images by using pseudo-closing, the image processing unit removes bright spots not accorded with the light sources from each image. Furthermore, when the image processing unit processes the images using image clustering, the image processing unit divides each image into region of interest (ROI) images to perform operations.

When the image processing unit processes the images using color recognition, the image processing unit determines each region of interest image based on color regions corresponding to the light sources. Besides, when each light source is a circular light source, the image processing unit performs circle detection on each light source using an image gradient circle detection method. Moreover, the calculation unit calculates the coordinates or vectors of the carrier using Simplex algorithm.

The other object of the present invention is providing an optical positioning method comprising the following steps. First, light-emitting units provide light sources of different colors. Then, image tracking units track the light sources and capture images. Then, an image processing unit processes the images to obtain light source images corresponding to each image of the light sources. Then, an analysis unit analyzes the light source images to obtain, positions and colors of the images, which are corresponding to the light-emitting units. Then, a calculation unit establishes three-dimensional coordinates corresponding to the light-emitting units based on the positions and colors of the images. Lastly, the calculation unit positions the carrier based on the three-dimensional coordinates.

The light sources comprise a red light source, a green light source, and a blue light source. Also, a calibration unit can calibrate the image tracking units by the neural network algorithm. Furthermore, the calculation unit can obtain the three-dimensional coordinates based on a stereo vision algorithm.

When the image processing unit processes the images using binary conversion, the image processing unit will retain brighter portions of each image. Besides, when the image processing unit processes the images by use of pseudo-closing, the image processing unit removes bright spots not accorded with the light sources from each image.

When the image processing unit processes the images using image clustering, the image processing unit divides each image into region of interest images to perform operations. In addition, when the image processing unit processes the images using color recognition, the image processing unit determines each region of interest image based on color regions corresponding to the light sources.

When each light source is a circular light source, the image processing unit performs circle detection on each light source using an image gradient circle detection method. Furthermore, the calculation unit calculates the coordinates or vectors of the carrier using Simplex algorithm.

As described above, the optical tracking device and the positioning method thereof according to the present invention may have one or more of the following advantages:

(1) The image tracking units of the optical tracking device can be individually tilted along horizontal axes and vertical axes to track active light sources.

(2) The optical tracking device and the positioning method thereof can be applied to surgical navigation to aid a surgeon in diagnosing nidus.

(3) The position of a carrier can be calculated based on positions of active light sources and colors of active light sources by means of the optical tracking device and the positioning method thereof.

DETAILED DESCRIPTION OF THE PREFERRED EMBODIMENTS

Figure 1:
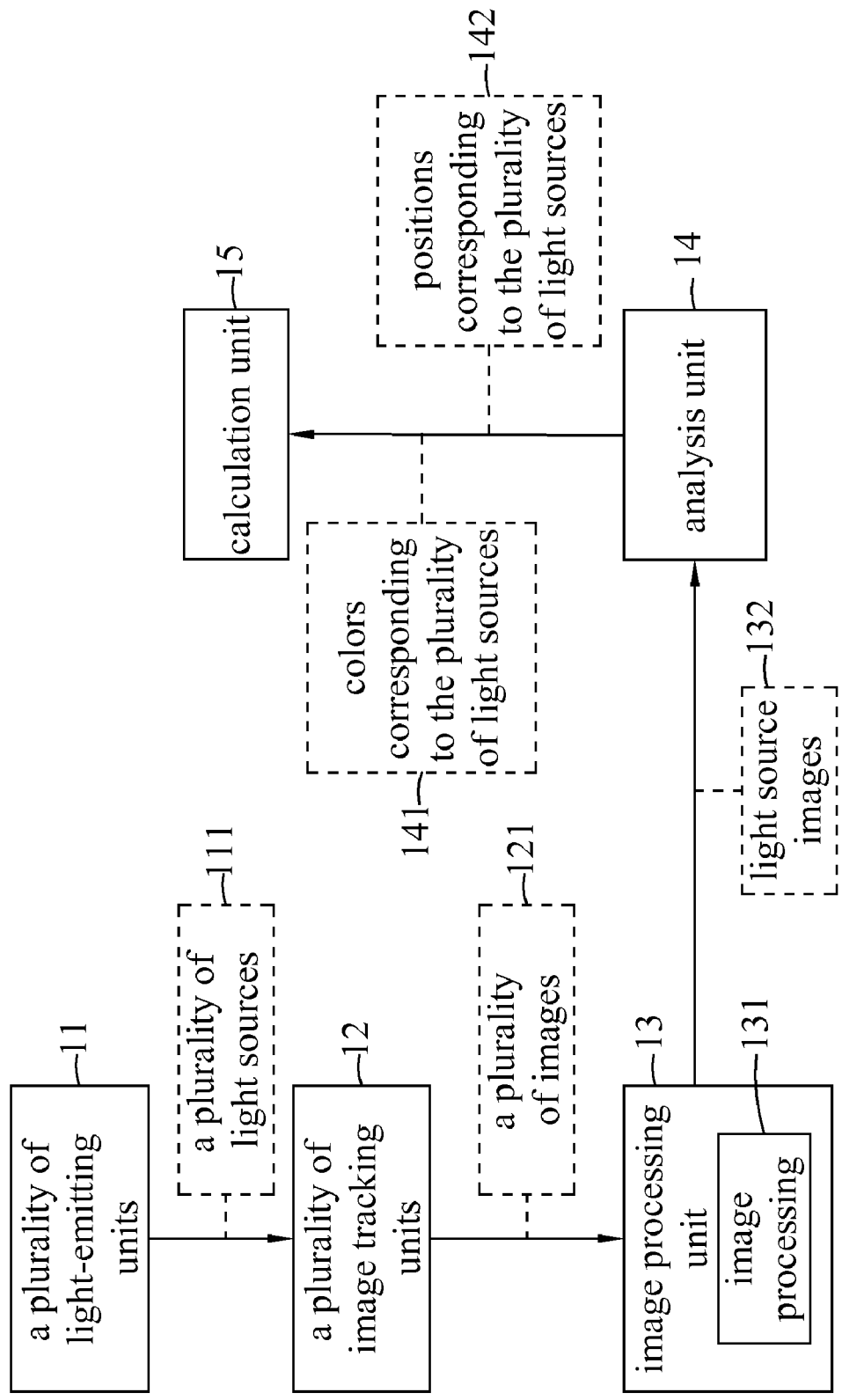
FIG. 1 is a block diagram of an optical tracking device according to the present invention.

Referring to FIG. 1, this figure illustrates a block diagram of an optical tracking device according to the present invention. In this figure, the optical tracking device 1 comprises light-emitting units 11, image tracking units 12, an image processing unit 13, an analysis unit 14, and a calculation unit 15. The light-emitting units 11 can be light-emitting diodes to provide light sources 111. The image tracking units 12 can be cameras individually tilted along horizontal axes and vertical axes to track the light sources 111 and capture images 121.

The image processing unit 13 can be connected with the cameras, and therefore the images 121 captured by the cameras can be subjected to image processing 131 by the image processing unit 13. Consequently, the image processing unit 13 can obtain light source images 132 by means of image processing 131. For example, the light source images 132 can be images of light-emitting diodes.

The analysis unit 14 is connected with the image processing unit 13. The analysis unit 14 analyzes the light source images 132 to obtain colors 141 corresponding to the light sources and positions 142 corresponding to the light sources. For instance, the analysis unit 14 can obtain the corresponding positions and corresponding colors of the light-emitting diodes.

The calculation unit 15 is connected with the analysis unit 14 and establishes three-dimensional coordinates of the respective light-emitting diodes based on the colors 141 corresponding to the light sources and the positions 142 corresponding to the light sources, and thus calculates the position of a carrier based on the three-dimensional coordinates of the light sources. The light sources can be light-emitting diodes disposed on a plane of the carrier in geometric distribution. Accordingly, the optical tracking device 1 of the present invention can track the light emitted by the light-emitting diode and therefore obtain the position of the carrier.

Figure 2:
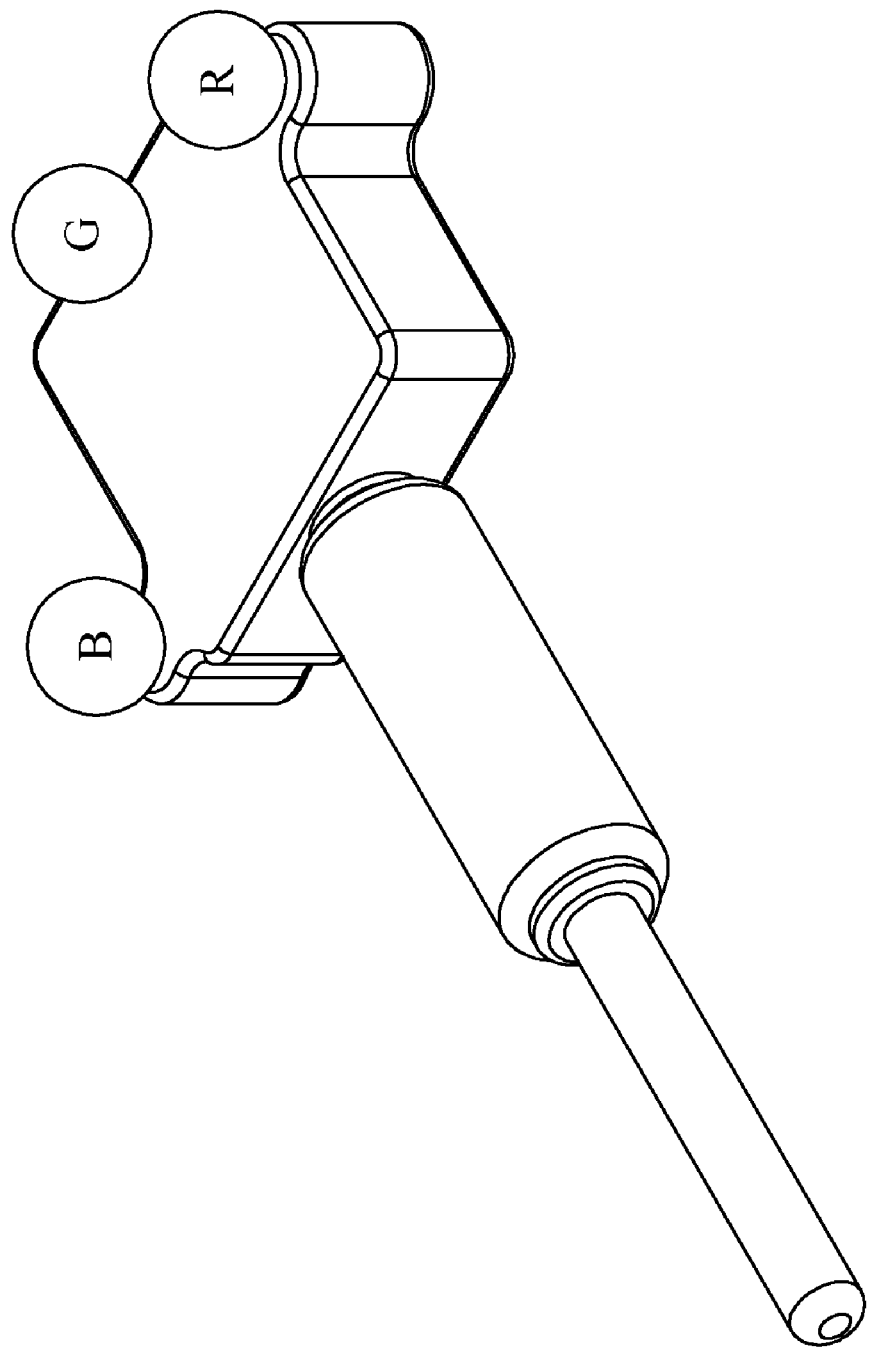
FIG. 2 is a schematic view showing light-emitting units disposed on a carrier according to the present invention.

Referring to FIG. 2, this figure illustrates a schematic view showing three light-emitting units disposed on a carrier according to the present invention. When the light-emitting units are light-emitting diodes, the three light-emitting diodes can define a plane which is located on the carrier. Also, the three light-emitting diodes can provide light sources of three different colors which can be red (R), green (G) and blue (B). Therefore, the three light-emitting diodes can comprise a red light-emitting diode, a green light-emitting diode, and a blue light-emitting diode. As a result, the light source images 132 in FIG. 1 can comprise images of red, green, and blue light-emitting diode light sources.

Principally, camera calibration techniques are classified into three categories: 3D reference object based calibration, 2D plane based calibration, and self-calibration. In the present invention, Zhang calibration method described in "A flexible new technique for camera calibration", IEEE Transactions on Pattern Analysis and Machine Intelligence (TPAMI), Vol. 22, Issue 11, pp. 1330-1334, Nov. 2000" is used to simultaneously calibrate two cameras, so as to obtain the relative geometry between two cameras. The steps of camera calibration are described as below:

1. Manufacturing a model plane: printing a checker pattern and attaching it on a planar surface.

2. Taking a few images of the model plane through different orientations simultaneously by left and right cameras. The size of a photographed image is 640×480 pixels.

3. Detecting coordinates of corner points in each image.

All the parameter matrices obtained by the left and right cameras are sequentially solved based on calculation formulas, thus, the transformation relationship between coordinate systems of the two cameras is obtained.

If a two-dimensional plane coordinate of an object have been obtained based on two two-dimensional images which correspond to each other at the same time, then the position coordinates of the object in a three-dimensional space can be calculated. First, homogeneous transformation relationship between world coordinates and image coordinates is defined, and the center of the lens of the left camera is taken as the origin of the world coordinate system. As shown in equation (1), (u, v) are ideal image coordinates, A is called the camera intrinsic matrix, R and T are called the camera extrinsic matrices, and P is called the perspective projection matrix. Since two cameras catch images in the present invention, the perspective projection matrix for the left camera is $P_l = A_l [I_{3 \times 3} | 0]$, the perspective projection matrix for the right camera is $P_r = A_r [R_s | t_s]$, and $(R_s, t_s)$ represent the transformation relationship between the two camera coordinate systems.

$$x_i = \begin{bmatrix} u \\ v \\ 1 \end{bmatrix} = P \begin{bmatrix} X \\ Y \\ Z \\ 1 \end{bmatrix} = A[R|T] \begin{bmatrix} X \\ Y \\ Z \\ 1 \end{bmatrix}, \quad P = A[R|T] \quad (1)$$

Equation (1) is expressed as:

$$\begin{bmatrix} u \\ v \\ 1 \end{bmatrix} \equiv \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ Z \\ 1 \end{bmatrix} \quad (2)$$

$$\begin{cases} u = \dfrac{p_{11}X + p_{12}Y + p_{13}Z + p_{14}}{p_{31}X + p_{32}Y + p_{33}Z + p_{34}} \\ v = \dfrac{p_{21}X + p_{22}Y + p_{23}Z + p_{24}}{p_{31}X + p_{32}Y + p_{33}Z + p_{34}} \end{cases} \quad (3)$$

Equation (3) is expressed in a matrix form as:

$$\begin{bmatrix} p_{31}u - p_{11} & p_{32}u - p_{12} & p_{33}u - p_{13} \\ p_{31}u - p_{21} & p_{32}u - p_{22} & p_{33}u - p_{23} \end{bmatrix} \begin{bmatrix} X \\ Y \\ Z \end{bmatrix} = \begin{bmatrix} p_{14} - p_{34}u \\ p_{24} - p_{34}v \end{bmatrix} \quad (4)$$

The equations (4) established by the left and right cameras are stacked together such that the simultaneous matrices become an over-determined linear equation system: $A_{4\times3}X=b_{4\times1}$, and the corresponding three-dimensional coordinates in space can be obtained from the minimum squares error solution $X=(A^TA)^{-1}A^Tb$ to the system.

Based on the above theory, calibration is performed as follows. Each time the calibration is done, the left and right cameras respectively take ten images of the model plane from different angles, and then the intrinsic and extrinsic parameters of the cameras are computed. The extrinsic parameters are listed in Table 1, and these parameters are used to reconstruct a three-dimensional space diagram of the cameras and the model plane.

TABLE 1

Parameters of geometry between two cameras

| $R_s$ | | | $T_s$ |
|---|---|---|---|
| 0.9864 | −0.0030 | 0.1640 | −221.5 |
| 0.0035 | 1.0000 | 0.0027 | −1.7 |
| 0.1640 | −0.0032 | 0.9864 | −27.7 |

This set of parameters in Table 1 can be used to compute coordinates of the object in the space accurately after the calibration is completed. The function of automatically tracking an object will be added later, that is, the camera angles can be adjusted automatically to track an object such that the object is in a visual range of the cameras. However, once the angle of camera changes, the extrinsic parameters subsequently vary. Thus, it is necessary to perform the calibration again and the procedure thereof is very sophisticated. To solve this problem, a neural network technique is employed in the present invention. Because there is a correlation between changes in the extrinsic parameters and angles between the two cameras, the calibration unit can calculate which angles between the cameras will result in corresponding extrinsic parameters by using a neural network.

The neural network architecture of the present invention is designed as a back propagation neural network, with 4 input layers, 3 output layers, and two 8×8 hidden layers to form a 4×8×8×3 structure. All the activation functions are hyperbolic tangent functions. Next, the cameras are calibrated at 100 sets of different angles to obtain the intrinsic and extrinsic parameters.

The parameters for the network training and their representative meanings are listed in Table 2.

TABLE 2

Parameters for neural network training

| | parameter | dimension | representative meaning |
|---|---|---|---|
| input value | Pan_left | 1 | pan angle of left camera |
| | Tilt_left | 1 | tilt angle of left camera |
| | Pan_right | 1 | pan angle of right camera |
| | Tilt_right | 1 | tilt angle of right camera |

TABLE 2-continued

Parameters for neural network training

| | parameter | dimension | representative meaning |
|---|---|---|---|
| target output | om | 3 × 1 | pan vector of extrinsic parameter R |
| target output | T | 3 × 1 | extrinsic parameter T |

Notice that the relationship between the camera angles and the extrinsic parameter R is not consistent with the relationship between the camera angles and the extrinsic parameter T. To avoid failure in converge, these two extrinsic parameters are trained separately. Fortuitously, both the two parameters have a dimension of 3×1, so the network structures are completely the same. The training is performed in a batch manner and the training conditions set as following: (1) the tolerance value of root mean square (RMS) is 0.001, (2) the maximum training times is 200000. The training will be terminated either one of the above conditions is met. After the training is completed, the network structures can be used in the optical tracking device according to the present invention. Once input the current angles of each camera into the network, the calibration values for the cameras at such angles can be immediately obtained to compute the position of the object in the three-dimensional space accurately.

After calibration, the two cameras can track the light-emitting units. LEDs are used as marks in the present invention because LEDs are active light sources. It is easier to search for the characteristics of the light sources. Besides, the colors of the three LEDs are red, green, and blue, respectively. These three colors have significant difference, so it is easier to differentiate the three marks during image processing.

After the two cameras capturing images, the image processing unit performs image processing selected from binary conversion, pseudo-closing, image clustering, color recognition, and circle detection. When the image processing unit carries out image binary conversion, it retains brighter portions of each image. When the image processing unit carries out a pseudo-closing, it removes bright spots (noise spots) that not accorded with active light sources from each image. When the image processing unit performs image clustering, the image processing unit divides each image into regions of interest to accelerate image processing. When the image processing unit performs color recognition, the image processing unit determines images based on color regions corresponding to the active light sources. When each light source is a circular light source, it performs circle detection on each light source using an image gradient circle detection method.

Mathematical morphology is a branch of image analysis based on lattice theory and topology, and is a basic theory of image processing. The aforementioned pseudo-closing is one of the fundamental operations in mathematical morphology.

Figure 3:
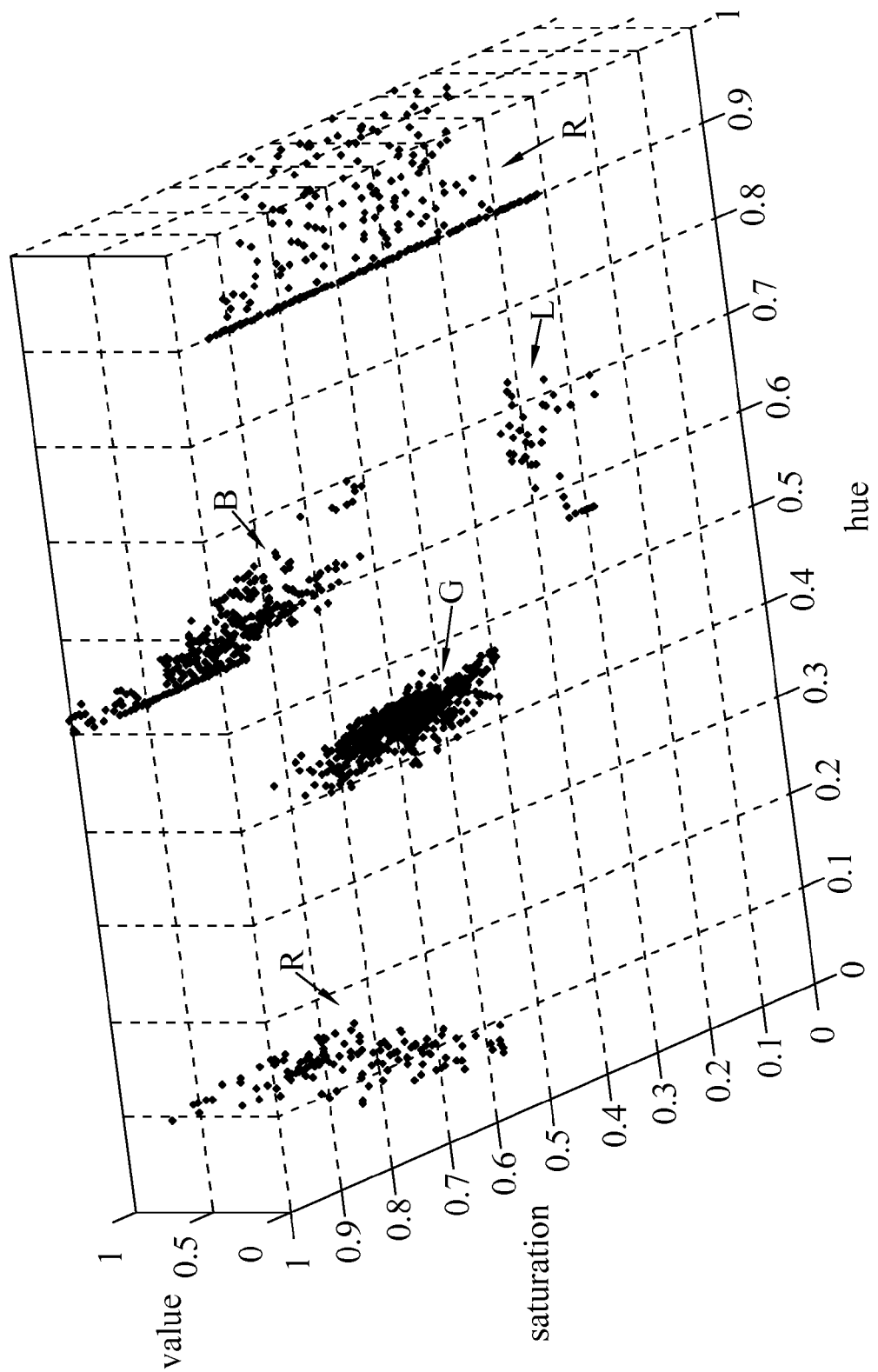
FIG. 3 is a schematic view showing a color space distribution according to the present invention.

Referring to FIG. 3, this figure illustrates a schematic view showing a color space distribution according to the present invention. In this figure, the image processing unit recognizes whether or not colors in ROI images accord with the color regions of the light-emitting units. To recognize the colors in the ROI images, the ROI images in a RGB color space are transformed to images in an HSV (hue, saturation, and brightness value) color space, as shown in the figure. The distribution of the colors (R, G, B) of each light-emitting unit can be significantly differentiated from the distribution of general brighter colors (L) according to the present invention. In such manner, bright sources not from the light-emitting units can be excluded and the colors of the light-emitting units can be recognized.

Figure 4:
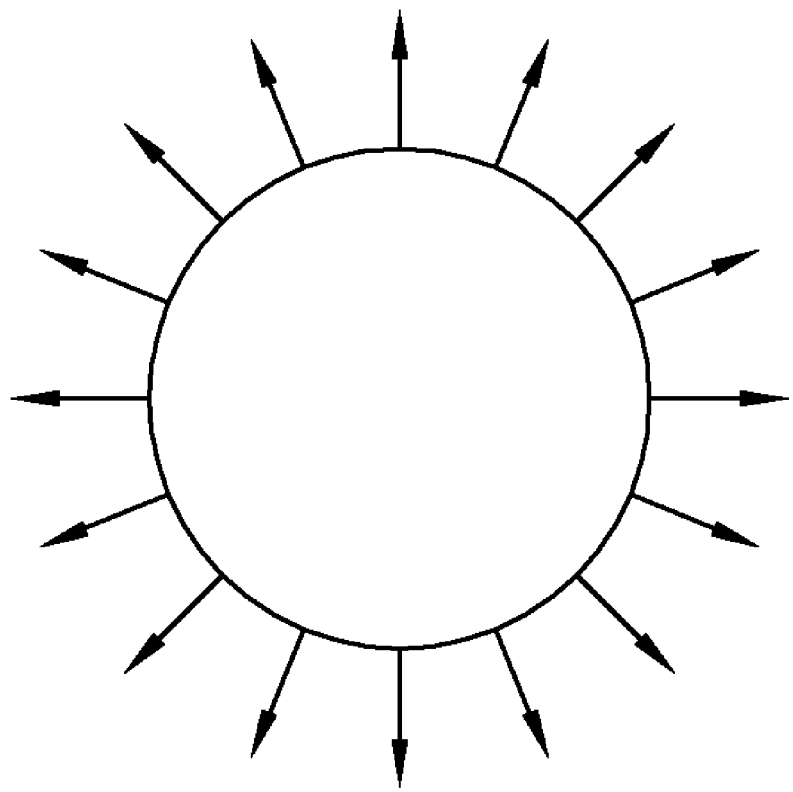
FIG. 4 is a schematic view showing a circular image and image gradients according to the present invention.
Figure 4:
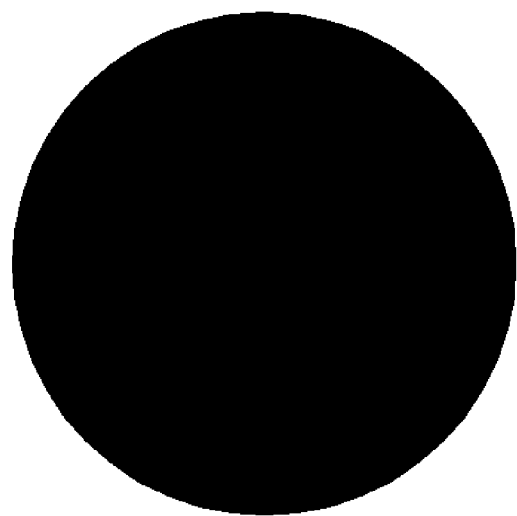

Referring to FIG. 4, this figure illustrates a schematic view showing a circular image and image gradients according to the present invention. After excluding the color regions not of the light-emitting units, "circle detection" is performed on the ROI images using an image gradient circle detection method. Literally, image gradient circle detection are using image gradients to detect a circle and to calculate its center and radius. The major advantage of the method is quick calculation, but the disadvantage is that if a single ROI includes more than one circle, a subsequent classification processing is required. In the present invention, three light-emitting units are used as marks, so a single ROI image does not include too many circles and the method is very suitable. The idea of the method is based on the symmetry of image gradients of circular images. As shown in the figure, there are illustrated a circular image and image gradients. It is apparent that the gradient pair vectors at any positions on such circles are symmetric.

Figure 5:
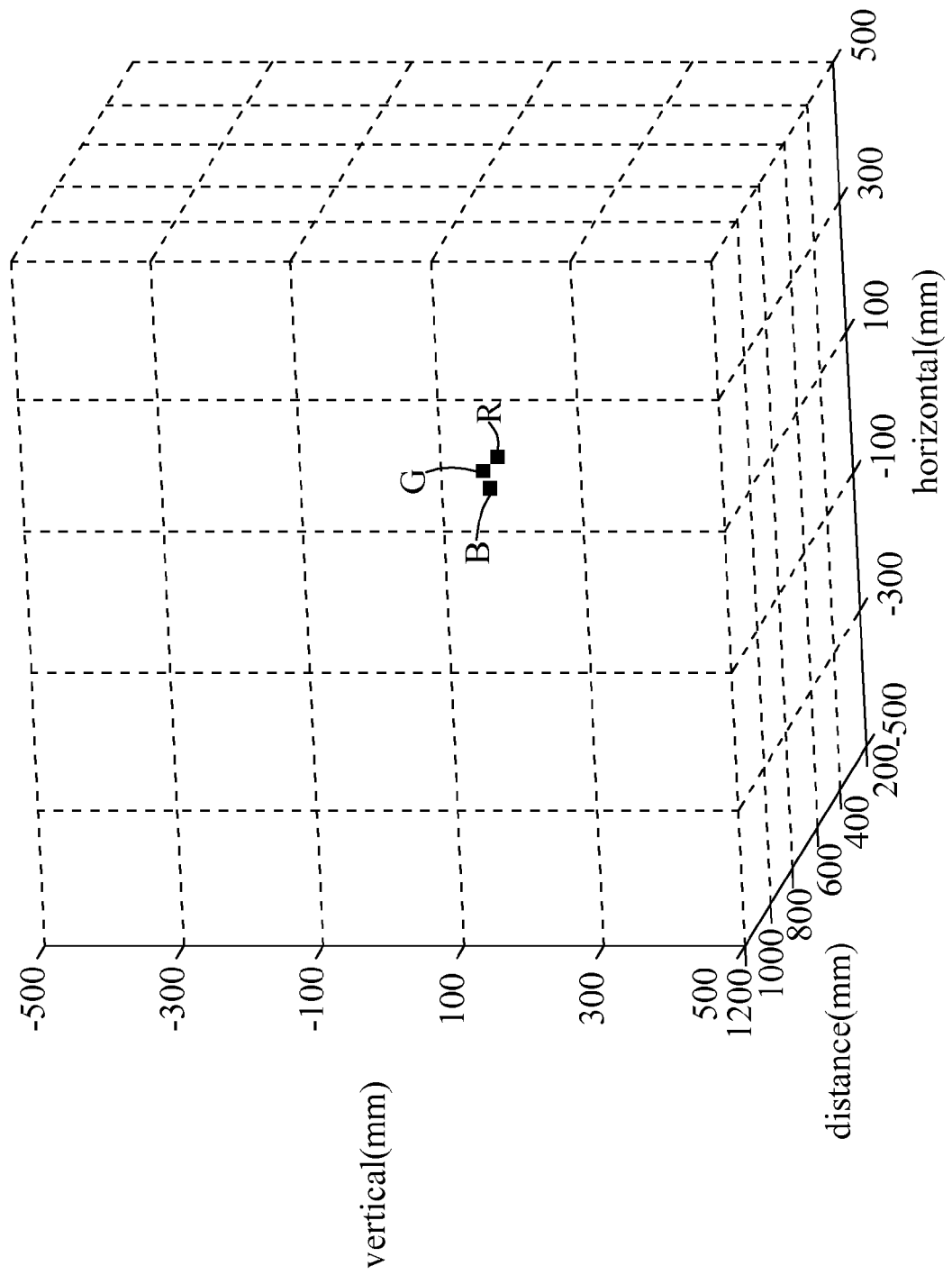
FIG. 5 is a schematic view showing light-emitting units in a three-dimensional space according to the present invention.

Referring to FIG. 5, this figure illustrates a schematic view showing light-emitting units in a three-dimensional space according to the present invention. After the analysis unit analyzing the light source images, positions and colors of images of the light-emitting units can be found. When the light-emitting units are LEDs and the colors of the light sources are red (R), green (G) and blue (B), the colors can correspond to positions of R, G and B in the figure. The calculation unit further reconstructs three-dimensional coordinates of the light-emitting units by the camera calibration parameters utilizing triangular similitude.

Figure 6:
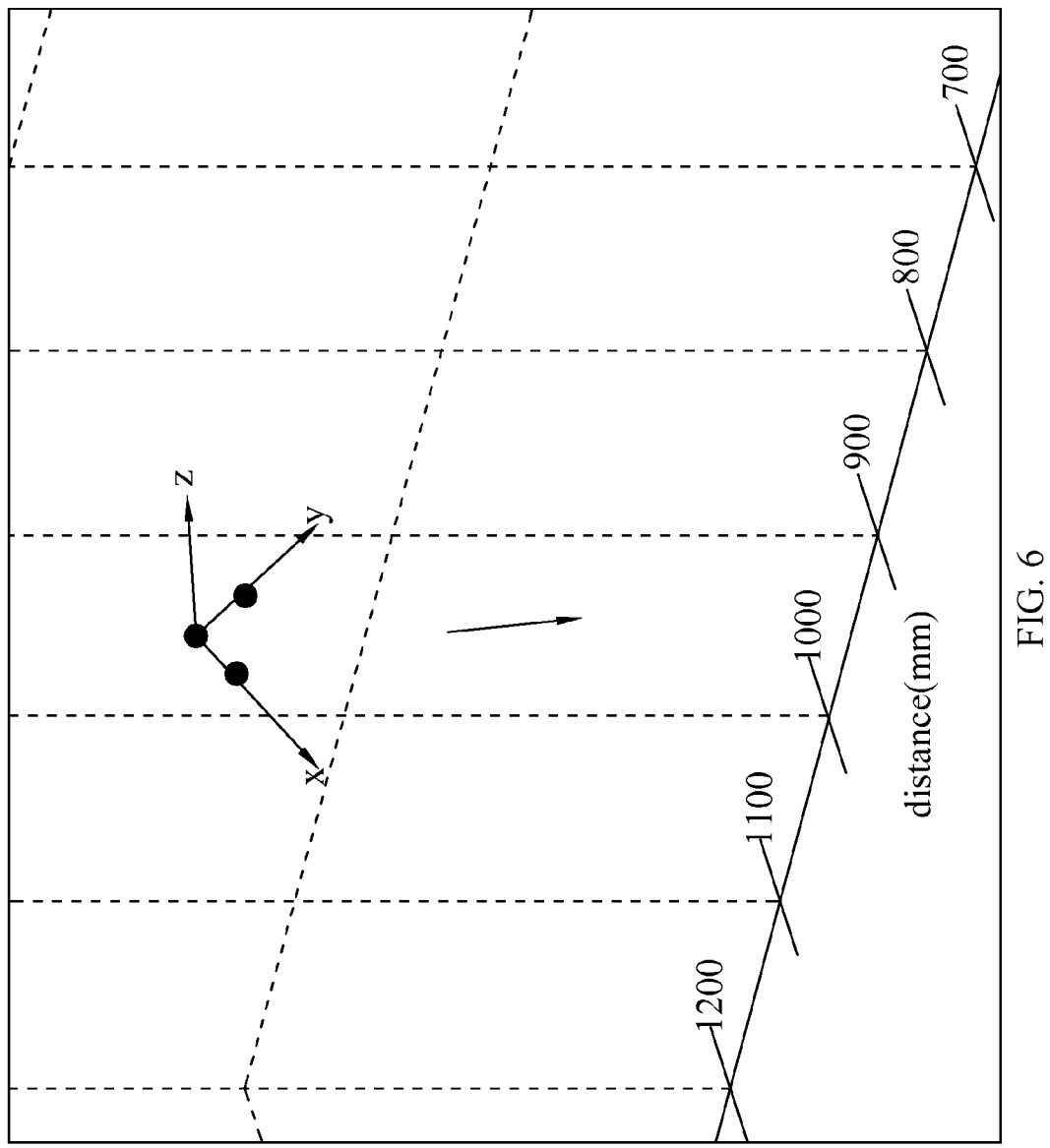
FIG. 6 is a schematic view showing the coordinates of light-emitting units and a carrier according to the present invention.

Referring to FIG. 6, this figure illustrates a schematic view showing the coordinates of light-emitting units and a carrier according to the present invention. The light-emitting units are disposed on the carrier which can be a surgical knife or a positioning stylus. When three LEDs are disposed on the positioning stylus, the cameras track LED light sources to estimate coordinates and vectors of the stylus tip by the coordinates of the three LEDs. This can be established by the "simplex optimization algorithm". Since the relative positions between the positions of the three LEDs and the stylus tip is fixed, they are not changed no matter where the LEDs of the positioning stylus are located. Therefore, the coordinate of the stylus tip is in the coordinate system established by the three LEDs. In the present invention, the stylus tip is fixed at a point and then the three-dimensional coordinate data of the LEDs are recorded while the positioning stylus is rotated. At this time, the position of the stylus tip is theoretically fixed so that stylus tip position variation can serve as an objective function in the simplex optimization algorithm. The position of the stylus tip relative to the LEDs can be obtained after calculation. Finally, it is possible to calculate positions and vectors of the stylus tip in three-dimensional space.

Figure 7:
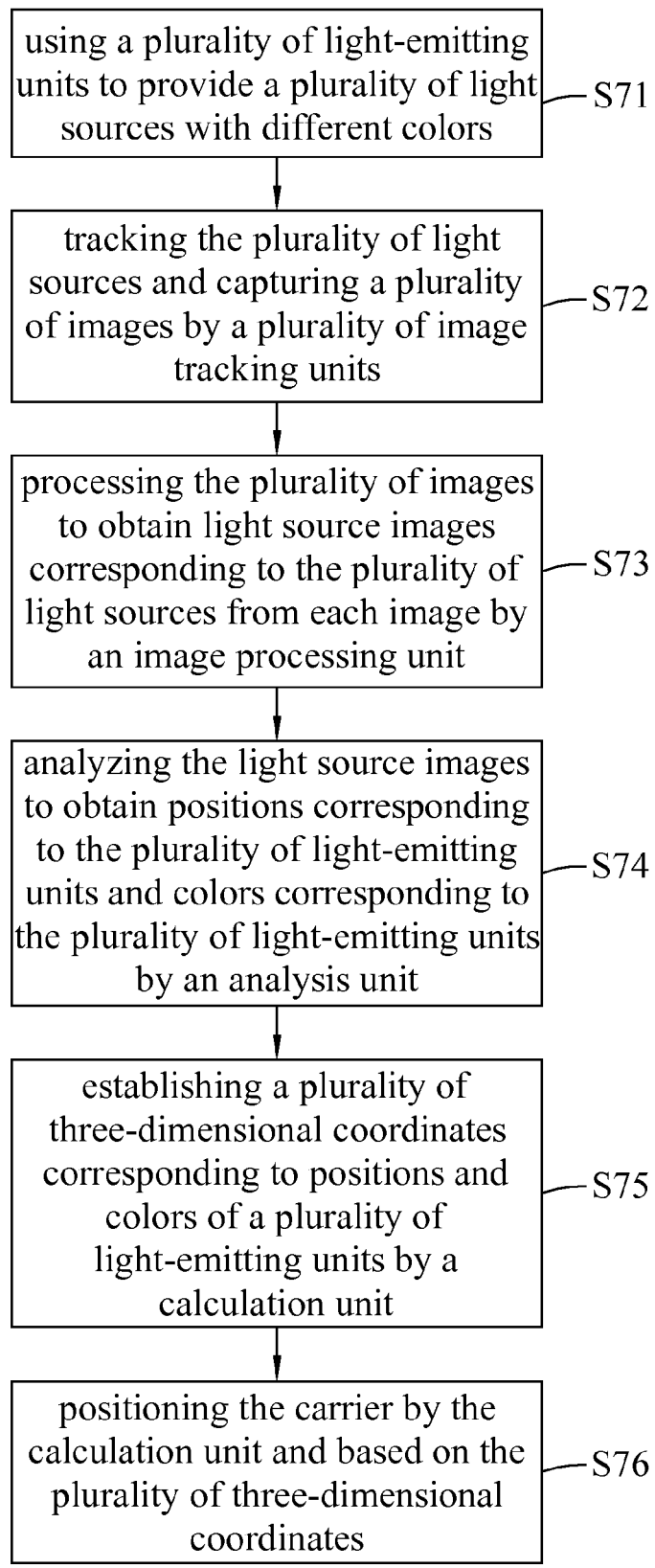
FIG. 7 is a flow chart showing the steps of an optical positioning method according to the present invention.

Referring to FIG. 7, this figure illustrates a flow chart showing the steps of an optical positioning method according to the present invention. In this figure, in step S71, light-emitting units are used to provide light sources of different colors. In step S72, image tracking units track the light sources and capture f images. In step S73, an image processing unit processes the images to obtain light source images corresponding to the light sources from each image. In step S74, an analysis unit is used to analyze the light source images to obtain positions corresponding to the light-emitting units and colors corresponding to the light-emitting units. In step S75, a calculation unit establishes three-dimensional coordinates corresponding to the light-emitting units based on the positions and colors. In step S76, the calculation unit positions the carrier based on the three-dimensional coordinates.

Figure 8:
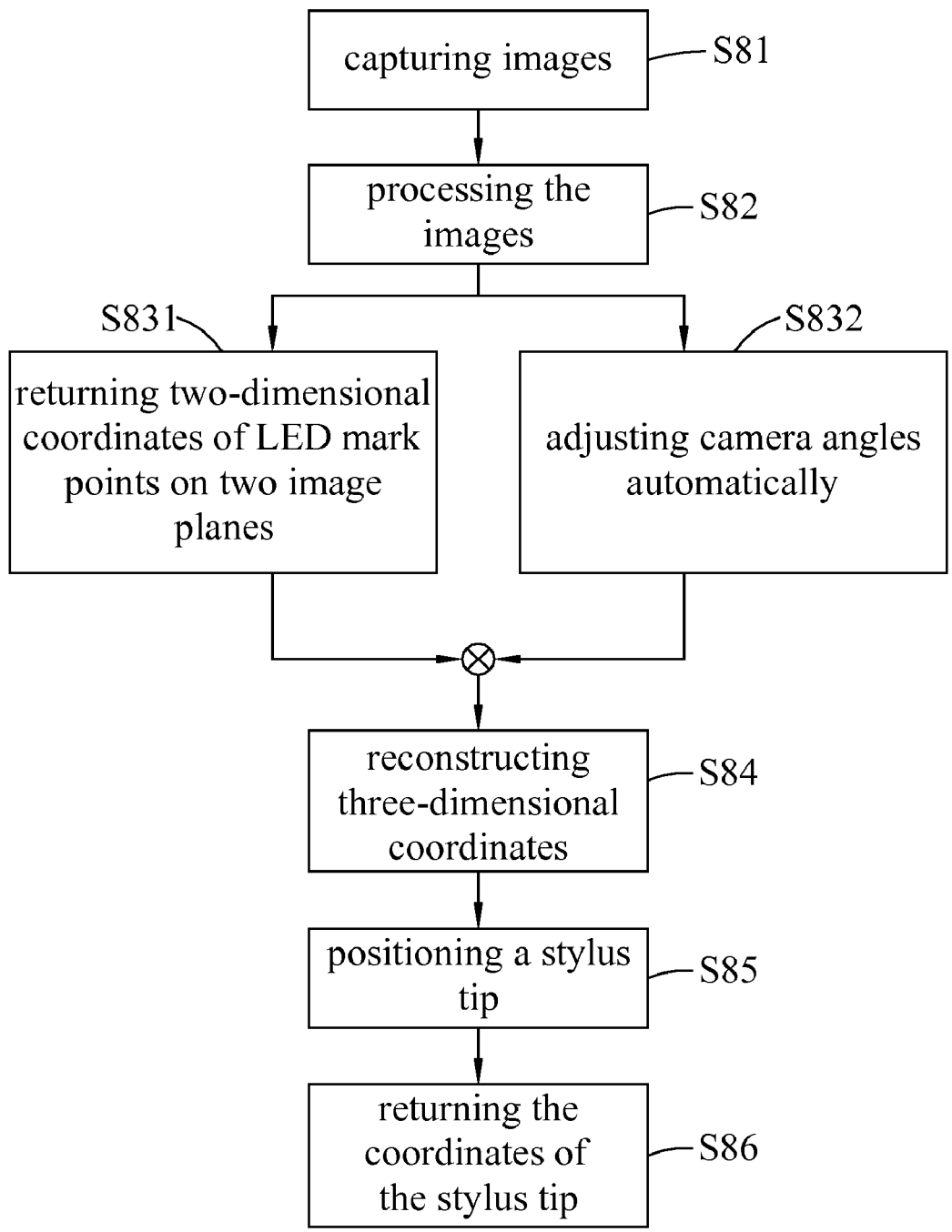
FIG. 8 is a flow chart showing the steps of an optical positioning method according to the first embodiment of the present invention.

Referring to FIG. 8, this figure illustrates a flow chart showing the steps of an optical positioning method according to the first embodiment of the present invention. In FIG. 8, images are captured in step S81. In step S82, the images are processed. In step S831, two-dimensional coordinates of LED mark points on two image planes are sent back. In step S832, camera angles are adjusted automatically and the camera angle data are simultaneously supplied to a pre-trained neural network structure to update the extrinsic parameters of the cameras in real time. In step S84, three-dimensional coordinates are reconstructed. By use of stereo vision theory, the two-dimensional coordinates and the intrinsic and extrinsic parameters of the cameras are substituted into the equations in stereo vision theory to obtain the three-dimensional coordinates of the three LED mark points. In step S85, a stylus tip is positioned. The three-dimensional coordinate of the stylus tip is estimated from the three-dimensional coordinates of the above three LED mark points. In step S86, the coordinate of the stylus tip is sent back.

Figure 9:
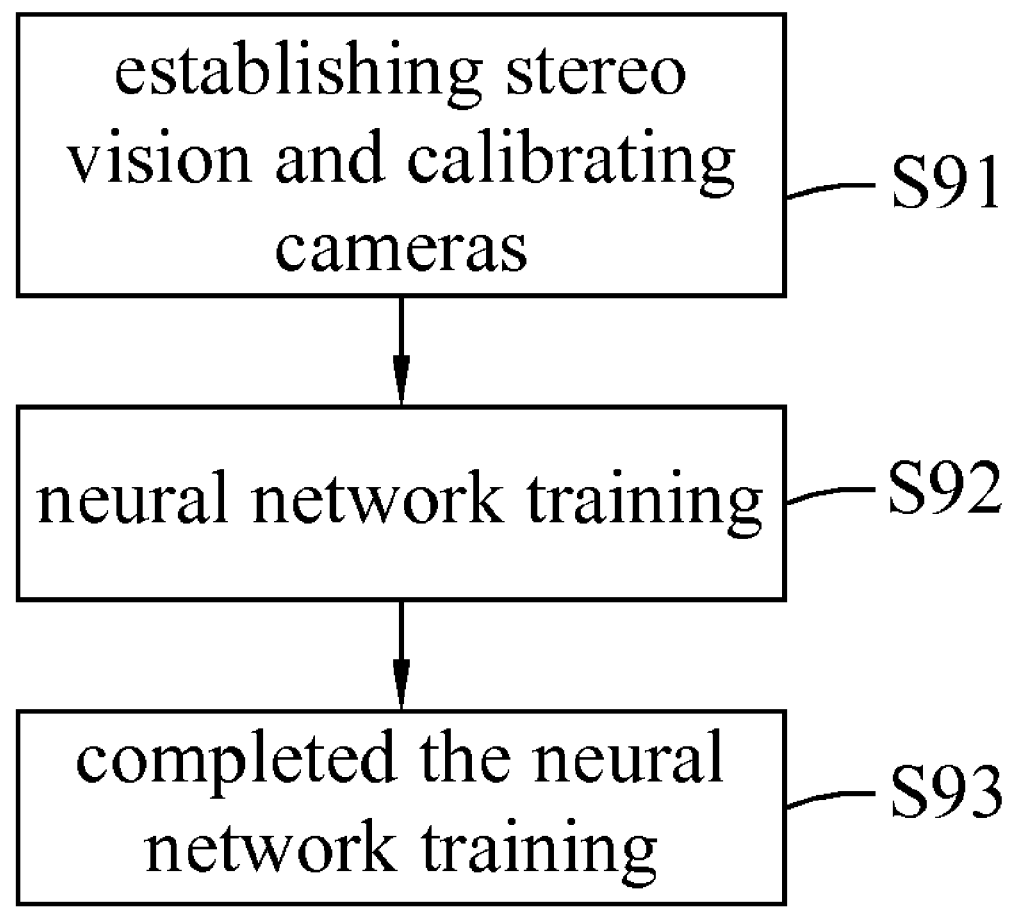
FIG. 9 is a flow chart showing the steps of obtaining extrinsic parameters of cameras by a neural network according to the present invention.

Referring to FIG. 9, this figure illustrates a flow chart showing the steps of obtaining extrinsic parameters of cameras by a neural network according to the present invention. In FIG. 9, stereo vision cameras are calibrated in step S91. The cameras are calibrated at different combinations of angles to generate different extrinsic parameters, and then all the data are recorded. In step S92, the data are supplied to the neural network for training purposes. The inputs to the network are the panned and tilt angles of the two cameras, and the target outputs are the parameters (om, T) of the cameras. In step S93, the camera calibration parameters can be obtained by the aforementioned network. Thus, three-dimensional coordinates are reconstructed by the parameters.

Figure 10:
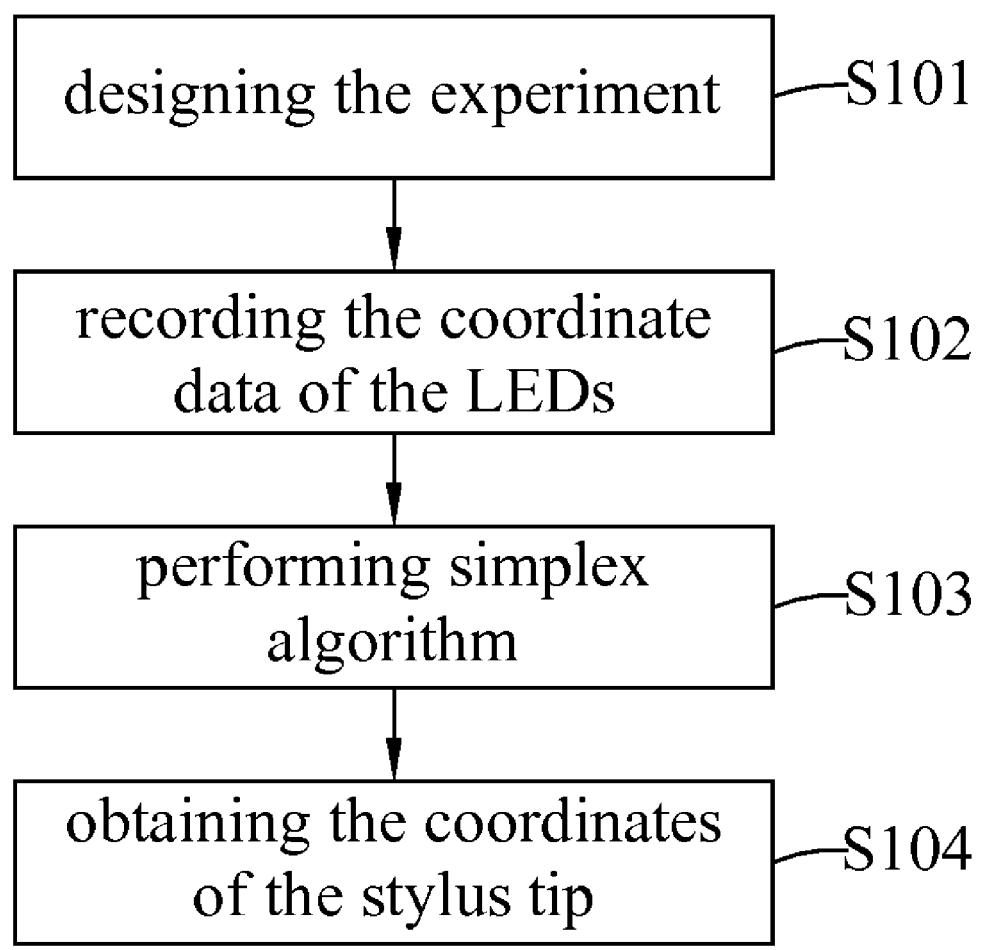
FIG. 10 is a flow chart of obtaining coordinates of a stylus tip by using Simplex algorithm according to an embodiment of the present invention.

Referring to FIG. 10, this figure illustrates a flow chart of obtaining coordinates of a stylus tip by using Simplex algorithm according to an embodiment of the present invention. In FIG. 10, in step S101, the experiment is designed that a stylus tip is fixed at a point and circles are freely drawn by the LED end, and the varying LED coordinates are used to estimate the coordinates of the fixed stylus tip. In step S102, the coordinate data of the LEDs are recorded. When the tip of the positioning stylus is fixed and circles are freely drawn using the LED end, the LED coordinates continuously change and are recorded in this duration. In step S103, the positions of the three LEDs on the positioning stylus can establish a coordinate system for the positioning stylus itself by only using the simplex algorithm. The three-dimensional coordinates of the stylus tip in the coordinate system are fixed values and the fixed value can be obtained using the optimization algorithm. A cost function is a variance of some points in the coordinate system when a circle is drawn by the LEDs. Therefore, when the cost is minimal, the obtained point coordinates indicate the position of the stylus tip in the positioning stylus coordinate system. In step S104, the coordinates of the stylus tip are obtained. The three-dimensional coordinates of the LEDs are in the camera coordinate system, but the position of the stylus tip obtained by the simplex algorithm is in the positioning stylus coordinate system. Finally, the coordinates of the stylus tip in the positioning stylus coordinate system are transformed into coordinates in the camera coordinate system and thus the positioning of the stylus tip is completed.

Figure 11:
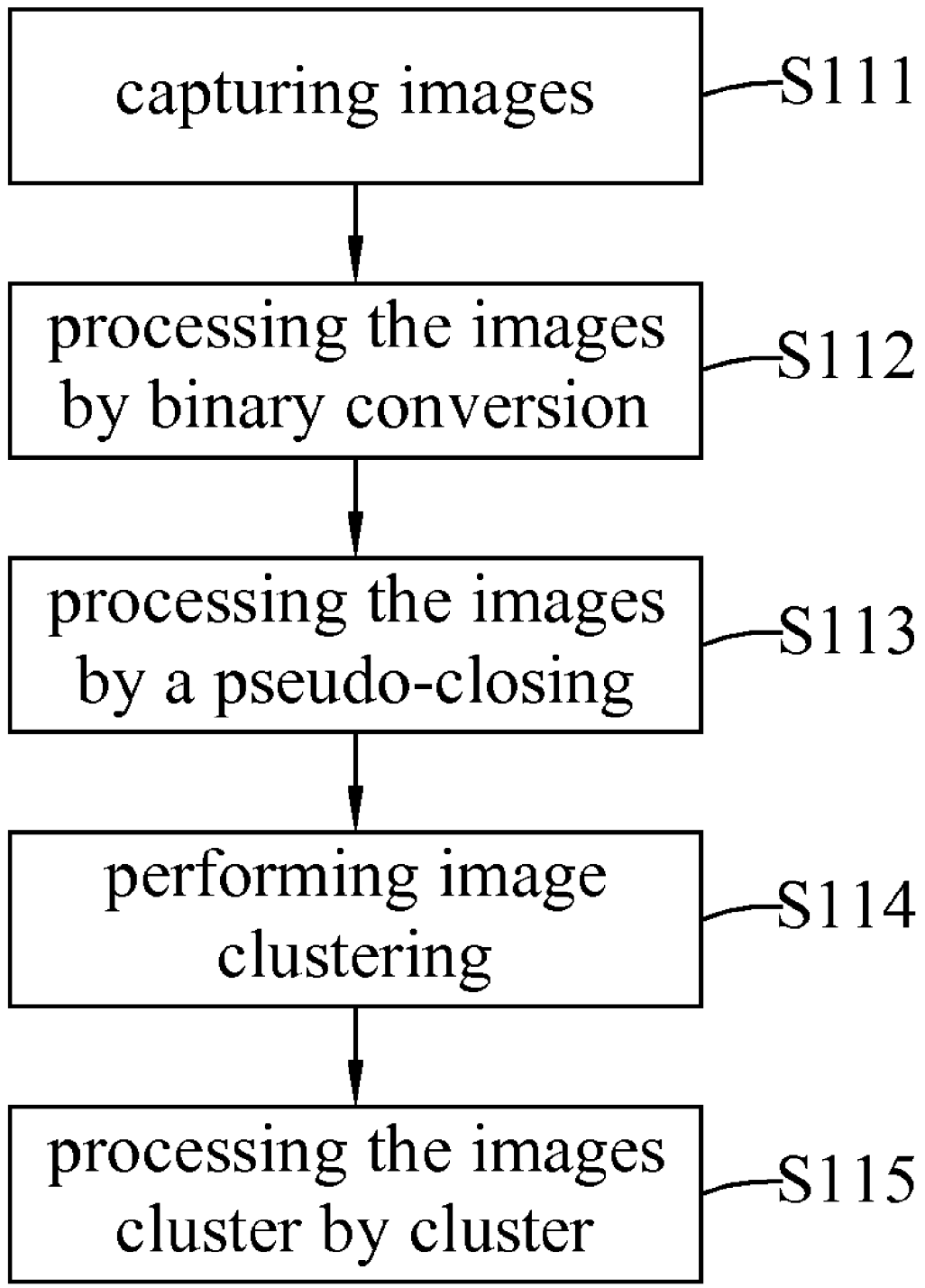
FIG. 11 is a flow chart of image processing according to an embodiment of the present invention.

Referring to FIG. 11, this figure illustrates a flow chart of image processing according to an embodiment of the present invention. In this figure, in step S111, image tracking units capture images. In step S112, an image processing unit is used to carry out image binary conversion. In step S113, the image processing unit is used to carry out a pseudo-closing so as to remove noise spots from the images. In step S114, the image processing unit is used to perform image clustering. The image clustering is performed by the following Step S115, in which the images are processed cluster by cluster.

Figure 12:
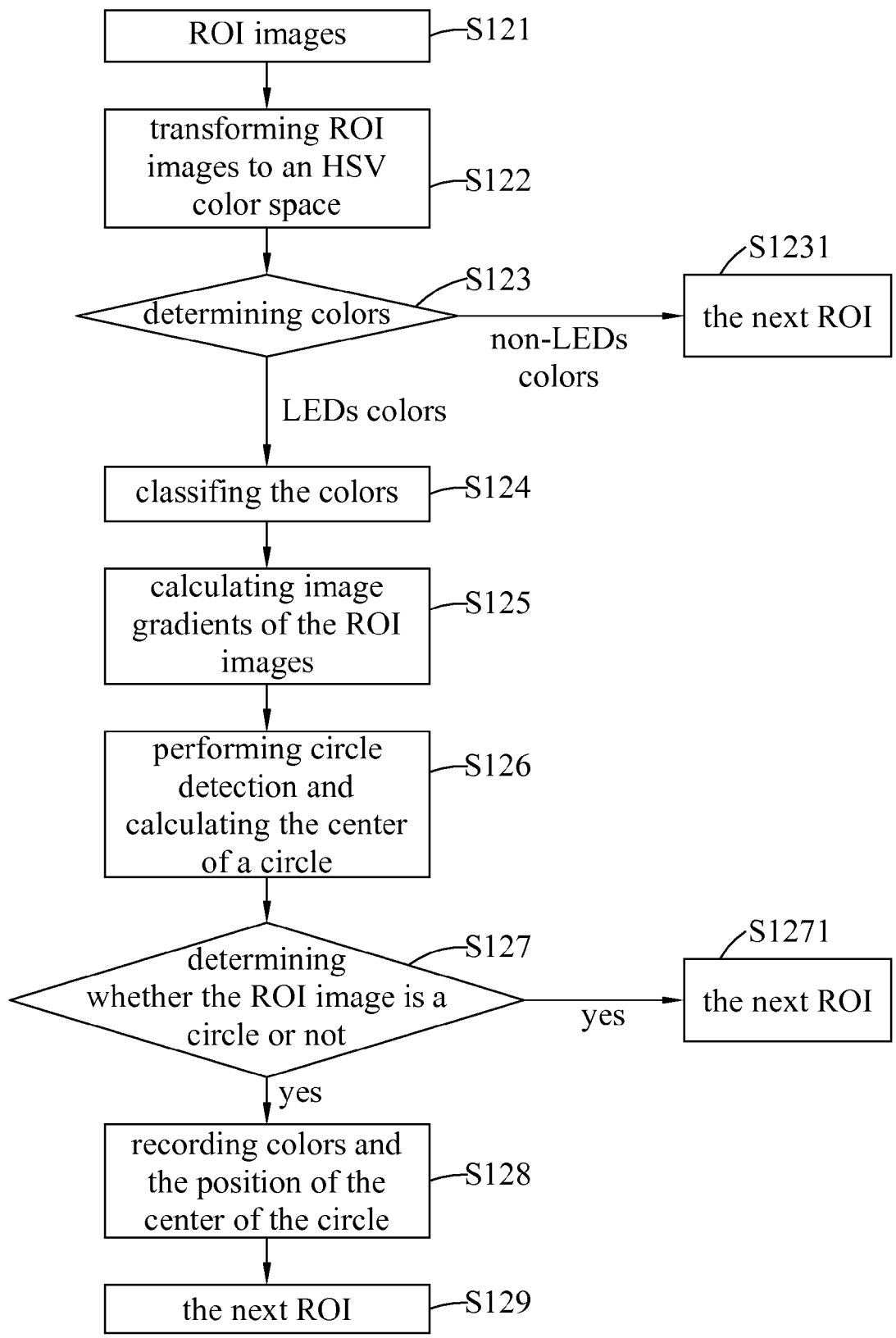
FIG. 12 is a flow chart of processing images cluster by cluster according to an embodiment of the present invention.

Referring to FIG. 12, this figure illustrates a flow chart of processing cluster by cluster according to an embodiment of the present invention. In this figure, in step S121, an image processing unit performs image clustering, and then the image processing unit divides each image into region of interest images (ROI images). In step S122, each ROI image in an RGB color space is transformed to an image in an HSV color space. In step S123, colors of each ROI image are determined. If the image processing unit determines that colors in an ROI image accorded with the colors of the LEDs, then step S124 is performed, in which the colors are classified. If the image processing unit determines that colors in an ROI image not accorded with the colors of the LEDs, then step S1231 is performed, in which colors of the next ROI image are determined. In step S125, image gradients of the ROI image are calculated. In step S126, circle detection and calculation of the center of a circle are performed. Next, in step S127, it is determined whether the ROI image is a circle or not. If yes, step S128 is performed, in which its center position and colors are recorded. If no, step S1271 is performed, in which circle detection is performed on the next ROI image. In step S129, the next ROI image is processed.

The above description is illustrative only and is not to be considered limiting. Various modifications or changes can be made without departing from the spirit and scope of the invention. All such equivalent modifications and changes shall be included within the scope of the appended claims.

What is claimed is:

1. An optical tracking device comprising:
   a plurality of light-emitting units correspondingly disposed on a plane of a carrier in geometric distribution, said plurality of light-emitting units providing a plurality of light sources of different colors;
   a plurality of image tracking units individually being tilted along horizontal axes and vertical axes in order to track said plurality of light sources and capture a plurality of images;
   an image processing unit connected with said plurality of image tracking units, said plurality of images being subjected to image processing by said image processing unit to obtain light source images corresponding to said plurality of light sources in said image;
   an analysis unit connected with said image processing unit, said analysis unit analyzing said light source images to obtain positions corresponding to said plurality of light-emitting units and colors corresponding to said plurality of light-emitting units; and
   a calculation unit connected with said analysis unit and establishing a plurality of three-dimensional coordinates corresponding to said plurality of light-emitting units based on said positions and colors, and said calculation unit further calculating the position of said carrier based on said plurality of three-dimensional coordinates.

2. The optical tracking device set forth in claim 1, wherein said plurality of light sources comprise a red light source, a green light source, and a blue light source.

3. The optical tracking device set forth in claim 1 further comprising a calibration, wherein said calibration unit calibrates said plurality of image tracking units by use of neural network algorithm.

4. The optical tracking device set forth in claim 1, wherein said calculation unit obtains said plurality of three-dimensional coordinates based on the stereo vision algorithm.

5. The optical tracking device set forth in claim 1, wherein said image processing unit retains brighter portions of each said image when said image processing unit processes said images using binary conversion.

6. The optical tracking device set forth in claim 1, wherein said image processing unit removes bright spots not accorded with said plurality of light sources from each said image when said image processing unit processes said images by use of pseudo-closing.

7. The optical tracking device set forth in claim 1, wherein said image processing unit divides each said image into a plurality of region of interest (ROI) images to perform operations when said image processing unit processes said images using image clustering.

8. The optical tracking device set forth in claim 7, wherein said image processing unit determines each said region of interest image based on color regions corresponding to said light sources when said image processing unit processes said images using color recognition.

9. The optical tracking device set forth in claim 1, wherein said image processing unit performs circle detection on each of said light source by image gradient circle detection method when each of said light sources is a circular light source.

10. The optical tracking device set forth in claim 1, wherein said calculation unit calculates the coordinates or vectors of said carrier using the simplex algorithm.

11. An optical positioning method comprising the following steps:
    providing a plurality of light sources of different colors by means of a plurality of light-emitting units;
    tracking said plurality of light sources by a plurality of image tracking units;
    capturing a plurality of images by said plurality of image tracking units;
    processing said plurality of images to obtain light source images corresponding to said plurality of light sources from each said image by an image processing unit;
    analyzing said light source images to obtain positions corresponding to said plurality of light-emitting units and colors corresponding to said plurality of light-emitting units by means of an analysis unit;
    establishing a plurality of three-dimensional coordinates corresponding to said plurality of light-emitting units based on said positions and colors by a calculation unit; and
    positioning said carrier based on said plurality of three-dimensional coordinates established by said calculation unit.

12. The optical positioning method set forth in claim 11, wherein said plurality of light sources comprise a red light source, a green light source, and a blue light source.

13. The optical positioning method set forth in claim 11 further comprising the step of calibrating said plurality of image tracking units by use of the neural network algorithm and by means of a calibration unit.

14. The optical positioning method set forth in claim 11 further comprising the step of obtaining said plurality of three-dimensional coordinates based on a stereo vision algorithm and by said calculation unit.

15. The optical positioning method set forth in claim 11 further comprising the step of retaining brighter portions of said images by said image processing unit when said image processing unit processes said images using binary conversion.

16. The optical positioning method set forth in claim 11 further comprising the step of removing bright spots not accorded with said plurality of light sources from each of said image by said image processing unit when said image processing unit processes said images by use of pseudo-closing.

17. The optical positioning method set forth in claim 11 further comprising the step of dividing each of said image into a plurality of region of interest (ROI) images to perform operations by said image processing unit when said image processing unit processes said images using image clustering.

18. The optical positioning method set forth in claim 17 further comprising the step of determining each of said region of interest image based on color regions corresponding to said light sources by said image processing unit when said image processing unit processes said images using color recognition.

19. The optical positioning method set forth in claim 11 further comprising the step of performing circle detection on each of said light source by said image processing unit and by using the image gradient circle detection method when each said light source is a circular light source.

20. The optical positioning method set forth in claim 11 further comprising the step of calculating the coordinates or vectors of said carrier by said calculation unit and by using the simplex algorithm.

* * * * *